(12) United States Patent
Muto

(10) Patent No.: US 12,716,728 B2
(45) Date of Patent: Aug. 25, 2026

(54) MAP GENERATION SYSTEM, IN-VEHICLE DEVICE

(71) Applicant: DENSO CORPORATION, Kariya-city (JP)

(72) Inventor: Shigehiro Muto, Kariya-city (JP)

(73) Assignee: DENSO CORPORATION, Kariya-city (JP)

( * ) Notice: Subject to any disclaimer, the term of this patent is extended or adjusted under 35 U.S.C. 154(b) by 386 days.

(21) Appl. No.: 17/186,930

(22) Filed: Feb. 26, 2021

(65) Prior Publication Data

US 2021/0180959 A1 Jun. 17, 2021

Related U.S. Application Data

(63) Continuation of application No. PCT/JP2019/033314, filed on Aug. 26, 2019.

(30) Foreign Application Priority Data

Aug. 31, 2018 (JP) ................................ 2018-163077
Jul. 31, 2019 (JP) ................................ 2019-141129

(51) Int. Cl.
*G01C 21/30* (2006.01)
*B60W 60/00* (2020.01)
(Continued)

(52) U.S. Cl.
CPC .......... *G01C 21/30* (2013.01); *B60W 60/001* (2020.02); *G01C 21/3453* (2013.01); (Continued)

(58) Field of Classification Search
CPC .......... G01C 21/28–32; G01C 21/3841; G01C 21/38–3896; G01C 21/3833–3859; G05D 1/00; G08G 1/00
See application file for complete search history.

(56) References Cited

U.S. PATENT DOCUMENTS 8,527,199 B1 * 9/2013 Burnette .......... G01C 21/3837 701/425
8,918,277 B2 12/2014 Niem et al.
(Continued)

FOREIGN PATENT DOCUMENTS

CN 105953805 A 9/2016
WO 2008118578 A2 10/2008

OTHER PUBLICATIONS

On-Road Automated Driving (ORAD) Committee, "Taxonomy and Definitions for Terms Related to Driving Automation Systems for On-Road Motor Vehicles", Jun. 2018, https://doi.org/10.4271/J3016_201806 (Year: 2018).*

*Primary Examiner* — Erin M Piateski
*Assistant Examiner* — Paul Allen
(74) *Attorney, Agent, or Firm* — Precision Patents, P.C.

(57) ABSTRACT

A method executed by at least one processor in accordance with assisted driving or automatic driving of a vehicle includes: acquiring road information from one or more sensors of the vehicle; acquiring a temporary map; calculating a difference amount A between route information generated from the temporary map and route information generated from the road information; and outputting a determination result indicating that quality of the temporary map is acceptable when the difference amount A is a predetermined value or less.

10 Claims, 5 Drawing Sheets

(51) Int. Cl.
*G01C 21/00* (2006.01)
*G01C 21/34* (2006.01)
*G01S 19/42* (2010.01)

(52) U.S. Cl.
CPC ..... *G01C 21/3807* (2020.08); *G01C 21/3841* (2020.08); *G01C 21/3859* (2020.08); *G01S 19/42* (2013.01); *B60W 2510/20* (2013.01); *B60W 2520/10* (2013.01)

(56) References Cited

U.S. PATENT DOCUMENTS 10,584,971 B1 * 3/2020 Askeland ........... G01C 21/3859
2004/0122590 A1 6/2004 Ito et al.
2006/0117297 A1 * 6/2006 Janssen ............... B60R 16/0237 717/120
2008/0275618 A1 * 11/2008 Grimm .................. G08G 1/162 701/96
2015/0254986 A1 * 9/2015 Fairfield ................ G08G 1/161 707/687
2016/0259814 A1 9/2016 Mizoguchi
2016/0282127 A1 * 9/2016 Goto ..................... G01S 5/0027
2018/0045517 A1 * 2/2018 Ahuja .................... G01C 21/32
2018/0151066 A1 * 5/2018 Oba ..................... G05D 1/0223
2018/0188036 A1 7/2018 Hasberg et al.
2018/0188045 A1 * 7/2018 Wheeler .............. G05D 1/0274
2018/0259972 A1 * 9/2018 Heo ...................... B60W 30/00
2018/0266833 A1 * 9/2018 Carlson .............. G01C 21/3815
2018/0292227 A1 * 10/2018 Stählin .................... H04W 4/38
2018/0292833 A1 * 10/2018 You ....................... B60W 50/14
2019/0025071 A1 * 1/2019 Fukui ................. G01C 21/3635
2019/0137287 A1 * 5/2019 Pazhayampallil ... G05D 1/0291
2019/0265050 A1 8/2019 Fujimoto
2019/0316915 A1 10/2019 Koda et al.
2020/0041285 A1 * 2/2020 Kato .................. G01C 21/3896

* cited by examiner

FIG.1

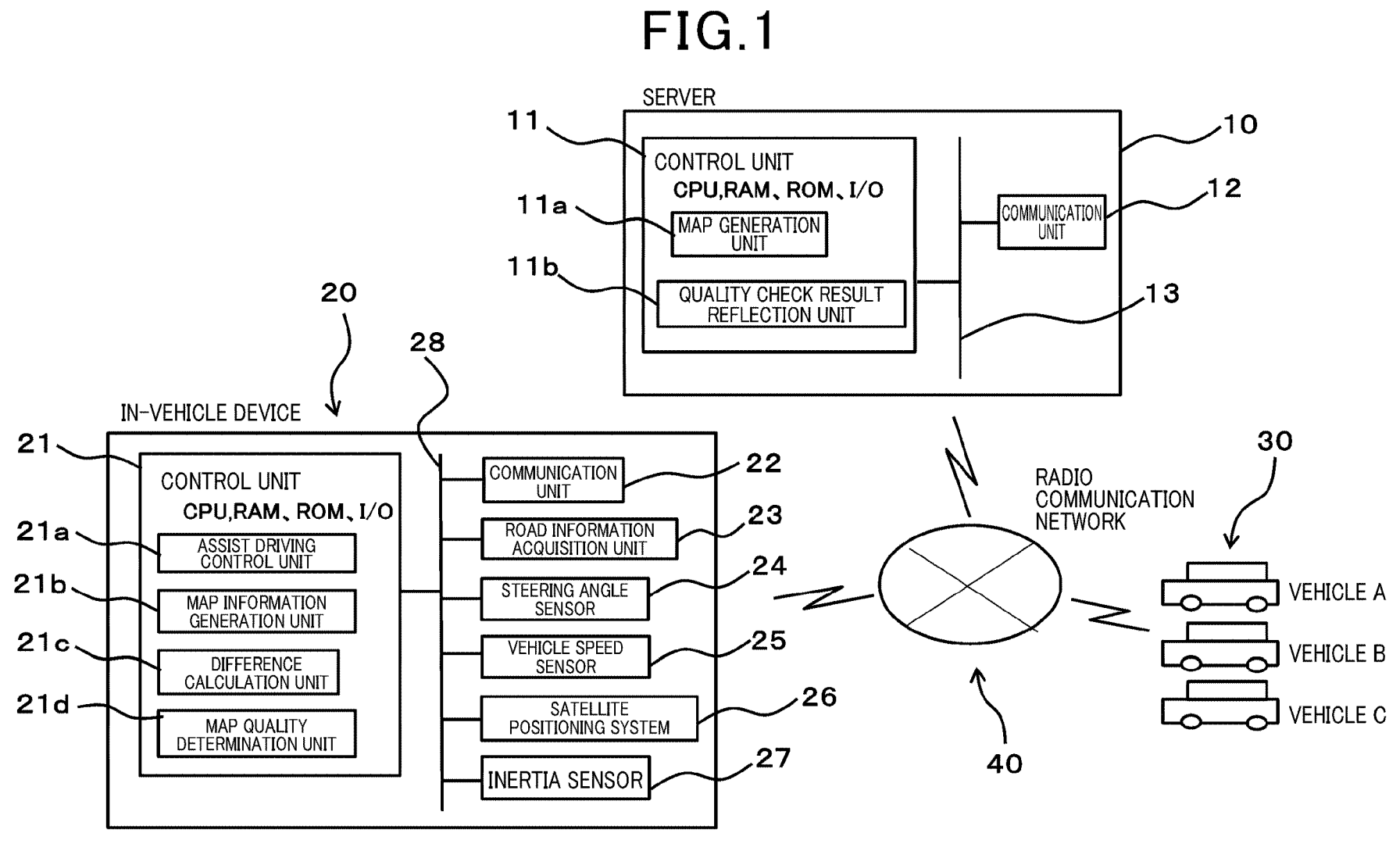

SERVER
10
11 CONTROL UNIT
CPU,RAM、ROM、I/O
11a MAP GENERATION UNIT
11b QUALITY CHECK RESULT REFLECTION UNIT
12 COMMUNICATION UNIT
13

RADIO COMMUNICATION NETWORK
40

30
VEHICLE A
VEHICLE B
VEHICLE C

IN-VEHICLE DEVICE
20
21 CONTROL UNIT
CPU,RAM、ROM、I/O
21a ASSIST DRIVING CONTROL UNIT
21b MAP INFORMATION GENERATION UNIT
21c DIFFERENCE CALCULATION UNIT
21d MAP QUALITY DETERMINATION UNIT
22 COMMUNICATION UNIT
23 ROAD INFORMATION ACQUISITION UNIT
24 STEERING ANGLE SENSOR
25 VEHICLE SPEED SENSOR
26 SATELLITE POSITIONING SYSTEM
27 INERTIA SENSOR
28

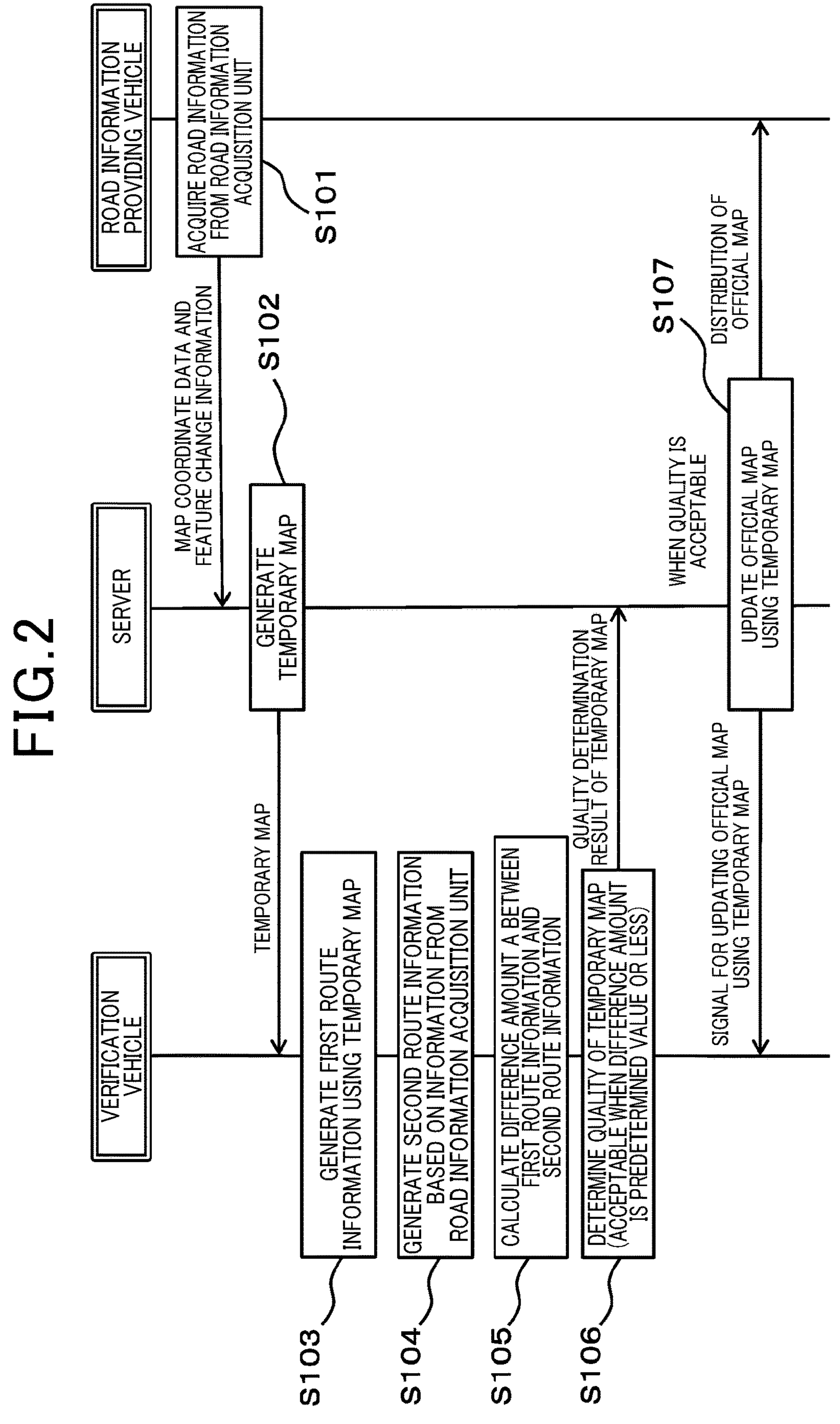
FIG. 2
ROAD INFORMATION PROVIDING VEHICLE
SERVER
VERIFICATION VEHICLE
ACQUIRE ROAD INFORMATION FROM ROAD INFORMATION ACQUISITION UNIT
S101
MAP COORDINATE DATA AND FEATURE CHANGE INFORMATION
S102
GENERATE TEMPORARY MAP
TEMPORARY MAP
GENERATE FIRST ROUTE INFORMATION USING TEMPORARY MAP
S103
GENERATE SECOND ROUTE INFORMATION BASED ON INFORMATION FROM ROAD INFORMATION ACQUISITION UNIT
S104
CALCULATE DIFFERENCE AMOUNT A BETWEEN FIRST ROUTE INFORMATION AND SECOND ROUTE INFORMATION
S105
DETERMINE QUALITY OF TEMPORARY MAP (ACCEPTABLE WHEN DIFFERENCE AMOUNT IS PREDETERMINED VALUE OR LESS)
S106
QUALITY DETERMINATION RESULT OF TEMPORARY MAP
WHEN QUALITY IS ACCEPTABLE
UPDATE OFFICIAL MAP USING TEMPORARY MAP
S107
DISTRIBUTION OF OFFICIAL MAP
SIGNAL FOR UPDATING OFFICIAL MAP USING TEMPORARY MAP

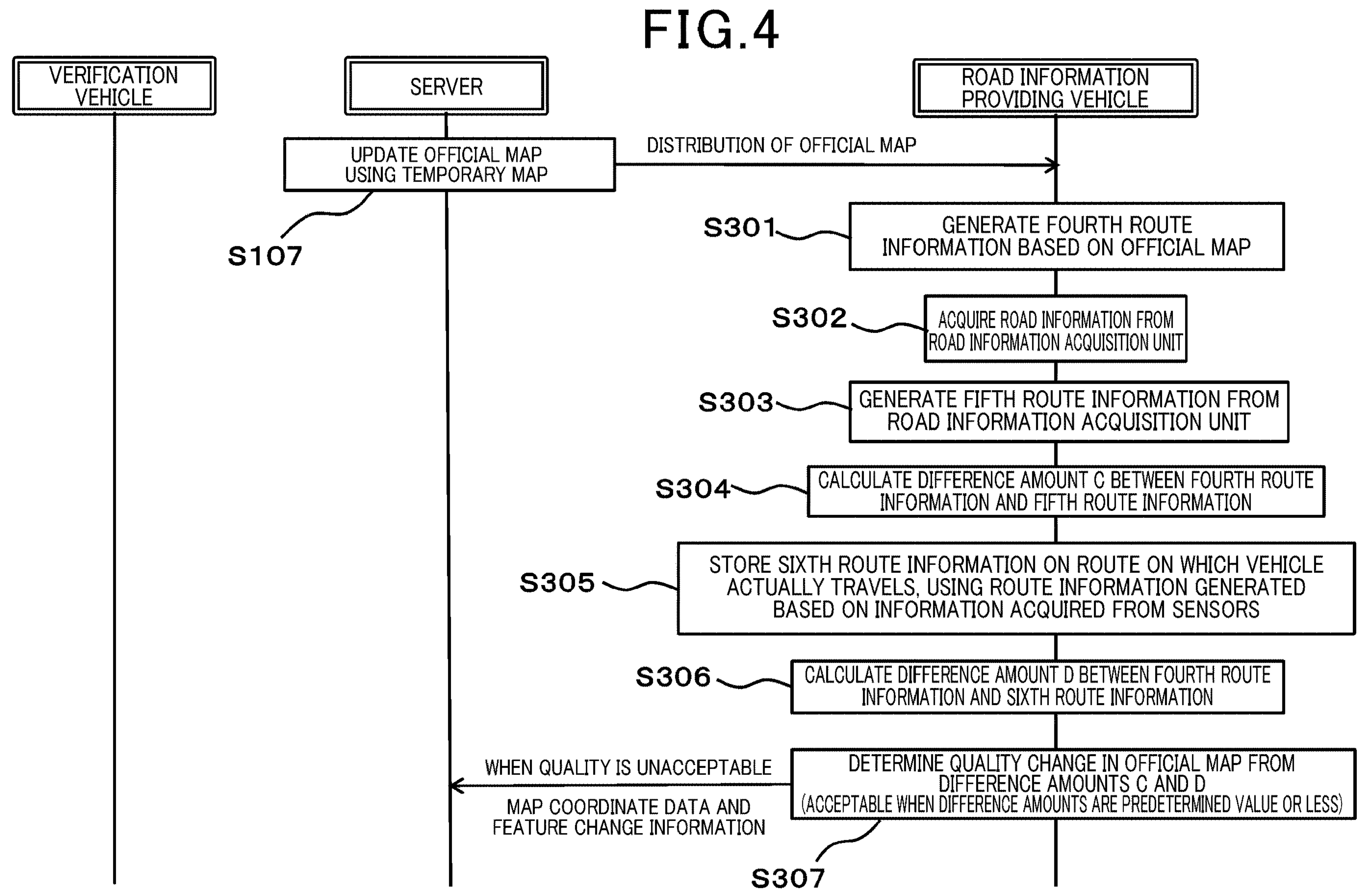
FIG.4
VERIFICATION VEHICLE
SERVER
ROAD INFORMATION PROVIDING VEHICLE
UPDATE OFFICIAL MAP USING TEMPORARY MAP
S107
DISTRIBUTION OF OFFICIAL MAP
S301
GENERATE FOURTH ROUTE INFORMATION BASED ON OFFICIAL MAP
S302
ACQUIRE ROAD INFORMATION FROM ROAD INFORMATION ACQUISITION UNIT
S303
GENERATE FIFTH ROUTE INFORMATION FROM ROAD INFORMATION ACQUISITION UNIT
S304
CALCULATE DIFFERENCE AMOUNT C BETWEEN FOURTH ROUTE INFORMATION AND FIFTH ROUTE INFORMATION
S305
STORE SIXTH ROUTE INFORMATION ON ROUTE ON WHICH VEHICLE ACTUALLY TRAVELS, USING ROUTE INFORMATION GENERATED BASED ON INFORMATION ACQUIRED FROM SENSORS
S306
CALCULATE DIFFERENCE AMOUNT D BETWEEN FOURTH ROUTE INFORMATION AND SIXTH ROUTE INFORMATION
WHEN QUALITY IS UNACCEPTABLE
MAP COORDINATE DATA AND FEATURE CHANGE INFORMATION
DETERMINE QUALITY CHANGE IN OFFICIAL MAP FROM DIFFERENCE AMOUNTS C AND D
(ACCEPTABLE WHEN DIFFERENCE AMOUNTS ARE PREDETERMINED VALUE OR LESS)
S307

ROAD
CHANGED PORTION
FEATURE
FEATURE
GENERATION OF TEMPORARY MAP
ROAD
CHANGED PORTION
FEATURE
FEATURE
QA=1
QA=0
QA=1

MAP GENERATION SYSTEM, IN-VEHICLE DEVICE

CROSS-REFERENCE TO RELATED APPLICATION

This application is the U.S. bypass application of International Application No. PCT/JP2019/033314 filed Aug. 26, 2019 which designated the U.S. and claims priority to Japanese Patent Application Nos. 2018-163077, filed Aug. 31, 2018 and 2019-141129, filed on Jul. 31, 2019 the contents of which are incorporated herein by reference.

BACKGROUND

Technical Field

The present disclosure relates to a map generation system and an in-vehicle device.

Description of the Related Art

As an indicator for determining quality of a map, evaluation based on freshness of the map is generally known. Such an indicator is insufficient to guarantee that the map allows a system to actually operate properly.

SUMMARY

A first aspect of the present disclosure is a method executed by at least one processor in accordance with assisted driving or automatic driving of a vehicle. The method includes: acquiring road information from one or more sensors of the vehicle; acquiring a temporary map; calculating a difference amount A between route information generated from the temporary map and route information generated from the road information; and outputting a determination result indicating that quality of the temporary map is acceptable when the difference amount A is a predetermined value or less.

BRIEF DESCRIPTION OF THE DRAWINGS

The above object and other objects, features, and advantages of the present disclosure will be more apparent from the following detailed description with reference to the accompanying drawings, wherein:

FIG. 1 is a block diagram showing a schematic configuration of a map generation system according to an embodiment;

FIG. 2 is a sequence diagram showing an outline of a process in the map generation system;

FIG. 4 is a sequence diagram showing an outline of a process in the map generation system.

DETAILED DESCRIPTION OF THE PREFERRED EMBODIMENTS

Figure 3:
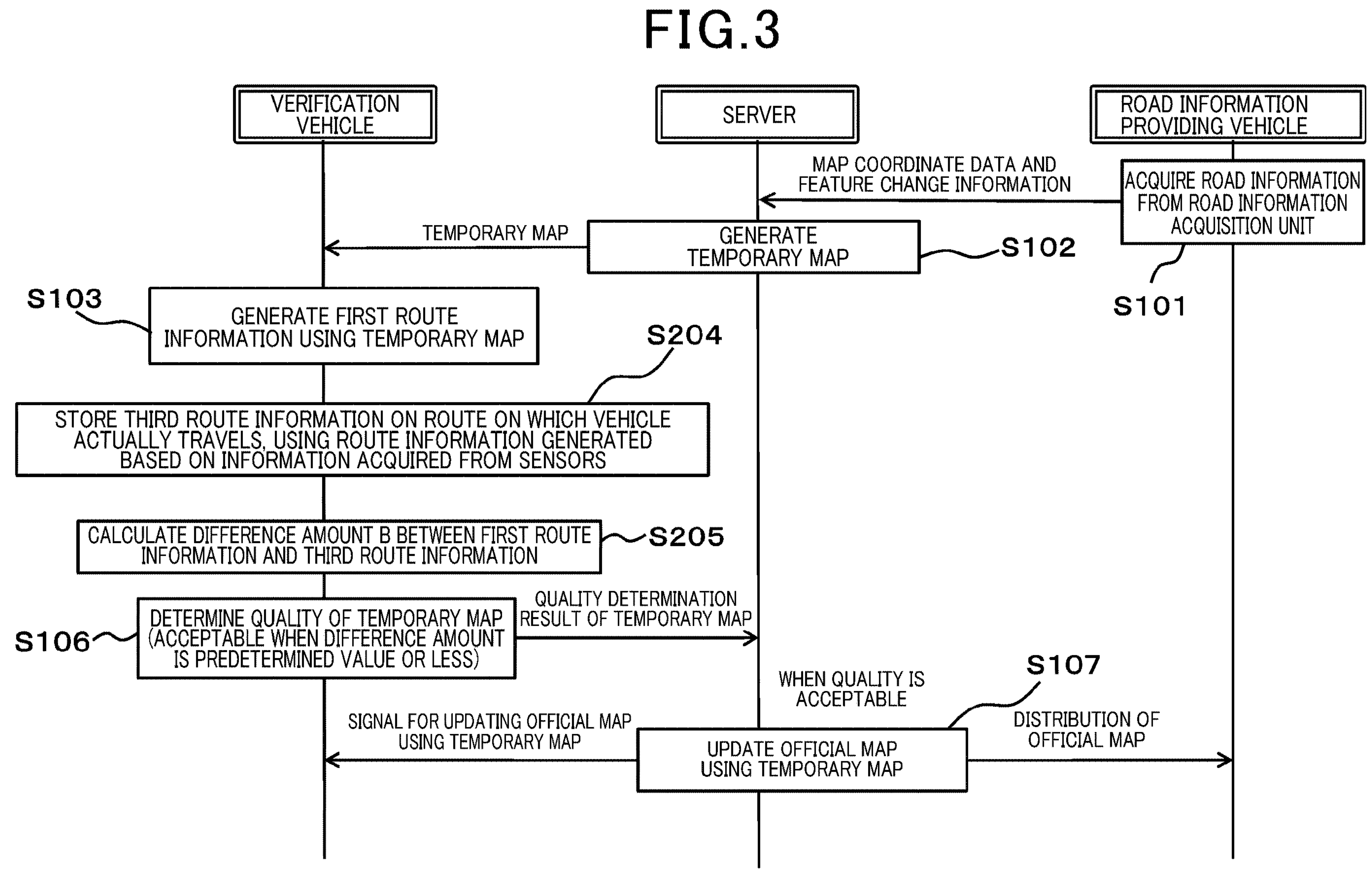
FIG. 3 is a sequence diagram showing an outline of a process in the map generation system.

As an indicator for determining quality of a map, evaluation based on freshness of the map is generally known. Such an indicator is insufficient to guarantee that the map allows a system to actually operate properly. There is a method, for example, patent literature, U.S. Pat. No. 8,918, 277 B discloses a technique in which sample evaluation of map data is performed by using, for example, a simulator that simulates an actual system, a test vehicle which is an actual vehicle or the like equipped with the system. However, such a method is insufficient to determine the actual nature of data sequentially updated using probe data.

Embodiments of the present disclosure will be described below with reference to the drawings. In the following description, the same elements as those described previously are denoted by the same reference numerals and the description thereof is omitted.

EMBODIMENT

As shown in FIG. 1, a map generation system 1 according to the embodiments includes a server 10, an in-vehicle device 20, and a road information providing vehicle 30. The server 10, the in-vehicle device 20, and the road information providing vehicle 30 are communicably connected to each other via a communication unit 12 and a communication unit 22 so as to be able to transmit and receive data through a radio communication network 40.

The server 10 includes a control unit 11 and the communication unit 12. The control unit 11 and the communication unit 12 are connected to each other via a data communication line 13. The control unit 11 is composed of, for example, a processor including a CPU, a RAM, a ROM, an I/O, and the like. The control unit 11 includes a map generation unit 11*a* and a quality check result reflection unit 11*b*.

The communication unit 12 transmits data information including map information, and the like to the in-vehicle device 20 of a verification vehicle and the road information providing vehicle 30 via the radio communication network 40. The control unit 11 executes, for example, a program stored in the ROM to implement functional units such as the map generation unit 11*a* and the quality check result reflection unit 11*b*. The map data may be, for example, data including coordinate information on various features that are present along a road. In an aspect, such map data corresponds to data for causing a vehicle to autonomously travel along a road.

The map generation unit 11*a* generates a temporary map and an official map on the basis of acquired map data. The quality check result reflection unit 11*b* updates the map information on the basis of acquired determination information on the temporary map. Furthermore, on the basis of the acquired determination information on the temporary map, the quality check result reflection unit 11*b* generates a signal for causing a distributed temporary map to be an official map. The quality check result reflection unit 11*b* transmits the official map and the signal for causing the temporary map to be an official map to the in-vehicle device 20 of the verification vehicle or the road information providing vehicle 30 via the communication unit 12.

The in-vehicle device 20 is installed in a verification vehicle that verifies a temporary map. The in-vehicle device 20 includes a control unit 21, the communication unit 22, and sensors. The sensors are devices capable of acquiring information necessary for each of assisted driving and automatic driving of the vehicle. The sensors include a road information acquisition unit 23 that recognizes a condition of a road and road surroundings, a steering angle sensor 24 that detects a steering angle of a steering wheel or a steered wheel of the vehicle, a vehicle speed sensor 25 that detects a vehicle speed, a satellite positioning system 26 that performs position measurement and time distribution by using a signal emitted from an artificial satellite, and an inertial sensor 27 that detects inertia of the vehicle.

Examples of the road information acquisition unit 23 include a camera, a LiDAR (light detection and ranging or laser imaging detection and ranging), and a millimeter wave radar. The above sensors are presented as examples, and the in-vehicle device 20 may be provided with other appropriate sensors required for the map generation system 1.

The in-vehicle device 20 detects an accurate position of the vehicle in chronological order on the basis of information acquired from the sensors. Furthermore, the in-vehicle device 20 recognizes information on the road surroundings, for example, recognizes a road condition such as a lane or recognizes a feature such as a roadside strip or a sign.

The control unit 21, the communication unit 22, and the sensors are connected to each other via a data communication line 28. The data communication line 28 is, for example, an in-vehicle network such as an in-vehicle LAN or CAN.

The control unit 21 is composed of a processor including a CPU, a RAM, a ROM, an I/O unit, and the like. The control unit 21 includes an assisted driving control unit 21*a* that controls assisted driving, automatic driving, or the like of the vehicle, a map information generation unit 21*b* that generates map information, a difference calculation unit 21*c* that calculates an amount of difference between generated various types of route information, and a map quality determination unit 21*d* that determines quality of a map.

The control unit 21 executes, for example, a program stored in the ROM by the CPU to implement functions of functional units such as the assisted driving control unit 21*a*, the map information generation unit 21*b*, the difference calculation unit 21*c*, and the map quality determination unit 21*d* and control the communication unit 22, the road information acquisition unit 23, the steering angle sensor 24, the vehicle speed sensor 25, the satellite positioning system 26, the inertial sensor 27, and the like.

Although illustration is omitted, the road information providing vehicle 30 has the same configuration as that of the in-vehicle device 20 shown in FIG. 1, that is, the road information providing vehicle 30 includes a control unit including an assisted driving control unit, a map information generation unit, a difference calculation unit, and a map quality determination unit, a communication unit, a road information acquisition unit, a steering angle sensor, a vehicle speed sensor, a satellite positioning system, an inertial sensor, and the like. The road information providing vehicle 30 transmits and receives various types of data information to the server 10 via the radio communication network 40. Three vehicles, i.e., vehicles X, Y, and Z are presented as examples of the road information providing vehicle 30, but a single vehicle or a larger number of vehicles may be employed as the road information providing vehicle 30.

As shown in FIG. 2, in the map generation system 1, the road information providing vehicle 30 acquires road information, for example, from an image detected by the road information acquisition unit of the road information providing vehicle 30 (S101). The road condition includes not only road information on a road on which the vehicle travels but also a condition of a roadside strip and information on features such as a road sign, a bridge, a station, and a store, landmarks, and the like.

The landmarks include, for example, traffic signals, poles, commercial signboards, stores, symbolic buildings such as historical buildings, road markings, and the like. The poles include streetlights, mirrors, utility poles, and the like. The road markings indicate markings painted on a road surface mainly for traffic control and traffic regulation. The road markings include, for example, lane boundary lines (e.g., division lines, lane marks) indicating a boundary between lanes, pedestrian crossings, stop lines, zebra zones, safety zones, regulation arrows, and the like.

The road markings also include road studs such as chatter bars and Botts' dots. Furthermore, the landmarks may be signboards corresponding to traffic signs such as regulatory signs, guide signs, warning signs, and indication signs. The guide signs indicate direction signboards, signboards that display an area name, signboards that display a road name, advance notice signboards that provide advance notice of the entrance or exit of an expressway, a service area, or the like.

Map coordinate data on a road and a feature and information on a change in a feature are detected from an official map distributed to the road information providing vehicle 30 and a difference between route information generated from the official map and a road condition acquired by the sensors such as a camera. The map coordinate data and the feature change information are transmitted to the server 10 (S101).

The above process performed in the road information providing vehicle 30 may be performed while assisted driving or automatic driving (hereinafter referred to as assisted driving or the like) of the vehicle is performed or while no assisted driving or the like is performed. When no assisted driving or the like is performed, operation such as generation of a route based on the official map described above is performed in the background of operation of the assisted driving control unit.

Next, when a predetermined number of pieces of map coordinate data and feature change information acquired from the plurality of road information providing vehicles 30 are accumulated, the server 10 generates a temporary map (S102). The temporary map has not been verified in actual use; thus, in the temporary map, a changed portion, for example, a portion at which a change in a feature has occurred is provided with a flag QA=0 that means that the portion is unverified. The generated temporary map is transmitted to the verification vehicle (S102).

A portion that has been verified and for which no problems were found is provided with a flag QA=1 that means that the portion is verified. The QA frag may be provided to each feature such as a landmark, or may be provided to each of groups obtained by dividing a road into predetermined sections.

In the verification vehicle that has received the temporary map, the in-vehicle device 20 of the verification vehicle performs verification of the temporary map. Specifically, the in-vehicle device 20 generates first route information in a shadow mode by using the temporary map (S103). The first route information is generated by the assisted driving control unit 21*a* of the in-vehicle device 20 of the verification vehicle.

The shadow mode means an operation mode in which the assisted driving control unit 21*a* generates route information for assisted driving or the like but no assisted driving or the like of the vehicle using the generated route information is performed. In this case, when the verification vehicle performs assisted driving or the like, assisted driving or the like is performed according to a route generated on the basis of an official map that has been officially distributed to the verification vehicle at this time point. That is, while assisted driving or the like based on the official map is performed, verification is performed in the shadow mode by using the route information generated from the temporary map.

In the verification vehicle, the in-vehicle device 20 generates second route information on the basis of information acquired by the sensors including the road information acquisition unit 23, the steering angle sensor 24, the vehicle speed sensor 25, the satellite positioning system 26, and the inertial sensor 27 (S104). The second route information is generated by the assisted driving control unit 21*a*. S103 and S104 are both performed in the shadow mode.

Next, the difference calculation unit 21*c* calculates a difference amount A between the first route information and the second route information (S105). The difference amount A is caused by, for example, a change in a feature such as an increase or decrease in signs, a detour from the route due to construction, or the like. At this point, the map information generation unit 21*b* generates difference map information based on the difference amount A. The difference map information may be generated, for example, as coordinate data on a portion at which a change in a feature has occurred or coordinate data on an alternative route.

Next, the map quality determination unit 21*d* determines quality of the temporary map (S106). The quality of the temporary map is determined on the basis of whether the difference amount A between the first route information and the second route information is a predetermined value or less. When the difference amount A is the predetermined value or less, the quality of the temporary map is determined to be acceptable, and when the difference amount A exceeds the predetermined value, the quality of the temporary map is determined to be unacceptable. The in-vehicle device 20 transmits a quality determination result of the temporary map to the server 10 (S106). At this time, the difference map information and coordinate data on the portion provided with QA=1 may be transmitted to the server 10.

When the quality of the temporary map is acceptable, in the server 10 that has acquired the quality determination result of the temporary map, the quality check result reflection unit 11*b* updates an official map using the temporary map (S107). Furthermore, the quality check result reflection unit 11*b* transmits a signal for updating an official map using the temporary map to the in-vehicle device 20 of the verification vehicle without transmitting official map data to the in-vehicle device 20 of the verification vehicle (S107). In the in-vehicle device 20 that has received the signal for updating an official map using the temporary map, the official map is updated to be the temporally map. At this time, in the in-vehicle device 20, an official map may be updated using the temporary map by reflecting the map coordinate data on the portion of the temporary map for which the quality determination result is QA=1.

In this manner, no official map including an enormous amount of data needs to be distributed again to the verification vehicle that already has the temporary map, leading to a reduction in the amount of data to be transmitted. In the verification vehicle that has received such a signal, an official map is updated to be the temporary map, and after that, assisted driving or the like is performed on the basis of the official map. Furthermore, the server 10 distributes, to the road information providing vehicle 30, the official map generated by updating (S107).

Verification of the temporary map described above may be performed so that, for example, when the temporary map is verified at an automatic driving level 2 or lower and the verification result indicates that the quality of the temporary map is acceptable, the temporary map after verification is applied to an automatic driving level 3, which is higher by one level than the automatic driving level at which the distributed temporary map has been verified. Thus, the temporary map data may include information on an automation level to which the temporary map can be applied. As described above, verification of the temporary map may be performed so that when the temporary map is verified at a lower automatic driving level and the verification result indicates that the quality of the temporary map is acceptable, the temporary map after verification is applied to an automatic driving level higher by one level than the automatic driving level at which the temporary map had previously been verified.

FIG. 3 shows a modification of the processing flow described in FIG. 2. In the verification vehicle, after the first route information is generated in the shadow mode by using the temporary map (S103), third route information which is information on a route on which the verification vehicle actually travels is specified and stored by using the official map at this time point and route information generated from information acquired from the sensors such as the road information acquisition unit 23, the vehicle speed sensor 25, the satellite positioning system 26, and the inertial sensor 27 (S204). Thus, at S204, the third route information which is information on a route on which the verification vehicle actually travels by assisted driving or the like using the in-vehicle device 20 of the verification vehicle is stored. At S204, the third route information may be information on a route on which the verification vehicle actually travels without being controlled by assisted driving or the like.

Next, a difference amount B between the first route information and the third route information is calculated (S205), and quality of the temporary map is determined (S106). The rest of the processing flow is the same as that shown in FIG. 2. The processing flow of the modification shown in FIG. 3 can reflect a change in the road condition of the actual travel route, and the like.

FIG. 4 shows a processing flow after the official map is updated to be the temporary map (S107), i.e., a processing flow continued from the processing flow in FIG. 2 or 3. In the processing flow shown in FIG. 4, the road information providing vehicle 30 performs verification of the official map. The road information providing vehicle 30 may be equipped with an assisted driving control system that performs assisted driving of the vehicle or equipped with an automatic driving control system that automatically drives the vehicle.

The road information providing vehicle 30 to which the official map has been distributed from the server 10 generates fourth route information on the basis of the official map (S301). In this case, it does not matter whether the road information providing vehicle 30 actually performs vehicle control by assisted driving or the like using the fourth route information. Thus, the road information providing vehicle 30 may perform verification of the official map in the shadow mode.

Next, the road information providing vehicle 30 acquires road information from the road information acquisition unit 23 (S302). Next, the road information providing vehicle 30 generates fifth route information from the road information acquired by the road information acquisition unit such as a camera (S303). The fifth route information is information on an estimated route generated on the basis of the information acquired from the road information acquisition unit 23. In this case, it does not matter whether the road information providing vehicle 30 performs vehicle control by assisted driving or the like using the fifth route information. Thus, the road information providing vehicle 30 may perform verification of the official map in the shadow mode.

Next, the road information providing vehicle 30 calculates a difference amount C between the fourth route information and the fifth route information (S304). The calculated difference amount is stored in a storage unit (not shown).

Next, on the basis of route information generated from information acquired from the sensors such as the road information acquisition unit, the vehicle speed sensor, the satellite positioning system, and the inertial sensor, the road information providing vehicle 30 specifies and stores sixth route information which is information on a route on which the road information providing vehicle 30 actually travels (S305). At S305, the sixth route information may be information on a route on which the road information providing vehicle 30 actually travels without being controlled by assisted driving or the like.

Next, the road information providing vehicle 30 calculates a difference amount D between the fourth route information and the sixth route information (S306). The calculated difference amount is stored in the storage unit (not shown).

Next, the road information providing vehicle 30 determines quality of the official map from the difference amounts C and D (S307). With regard to the quality of the official map, the difference amounts C and D exceeding a predetermined value mean that the quality is deteriorated, that is, the feature information or the like in the official map has changed after distribution of the official map and no longer matches the actual features. In this case, the quality of the official map is determined to be unacceptable. When the quality of the official map is unacceptable, the road information providing vehicle 30 transmits, to the server 10, map coordinate data on a changed portion and feature change information which is information on a change in a feature.

Thus, when the quality of the official map is evaluated to be unacceptable, map coordinate data on a changed portion and feature change information are transmitted from the plurality of road information providing vehicles 30 to the server 10, and are sequentially accumulated in the server 10. When a predetermined number of pieces of map coordinate data on a changed portion and feature change information are accumulated, as shown at S102 in FIG. 2 or 3, the server 10 generates a temporary map.

Figure 5:
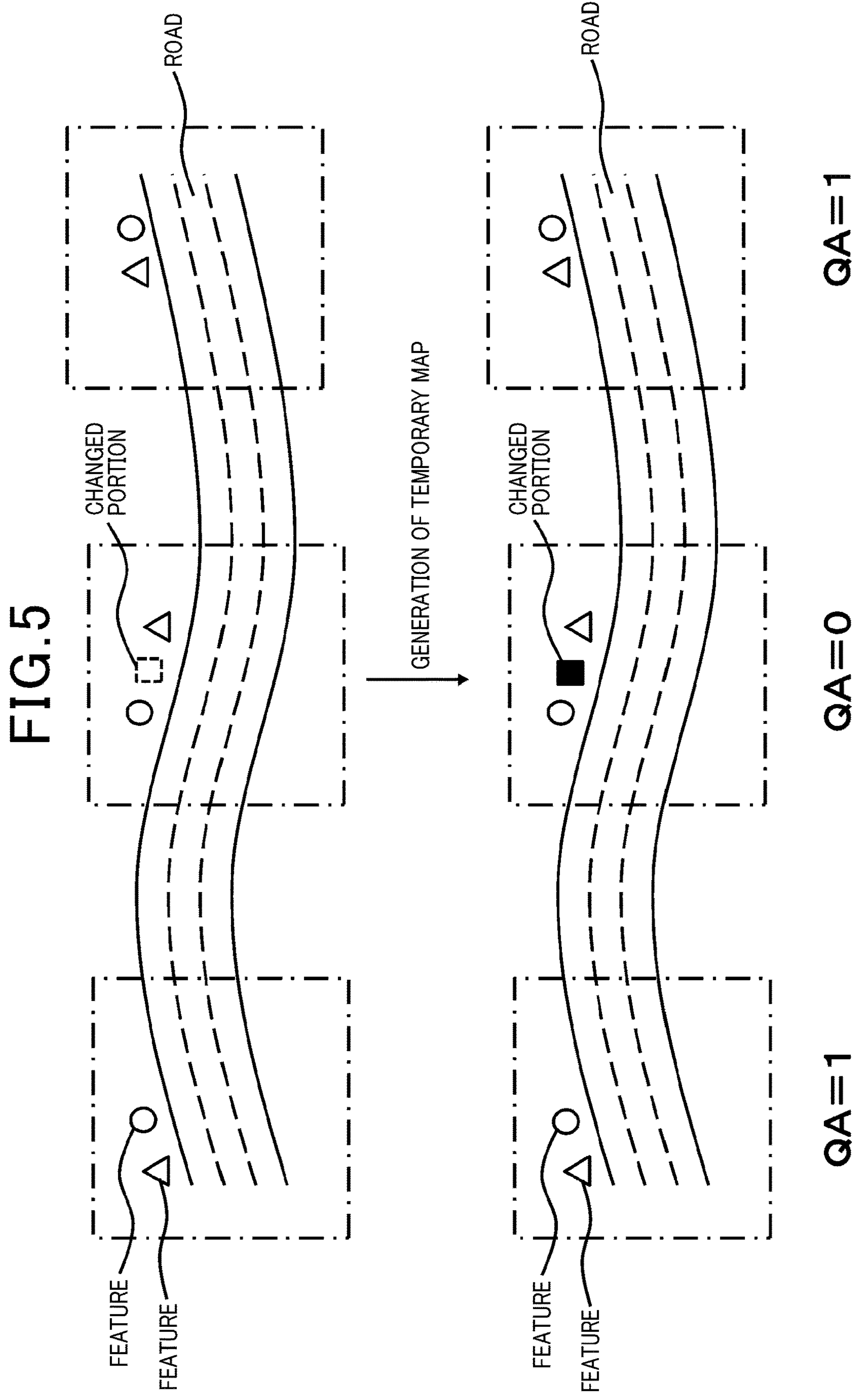
FIG. 5 shows an example of a changed portion of a temporary map.

The subsequent process follows the processing flow described in FIGS. 2 to 4. As shown in FIG. 5, when a portion at which a change in a feature has occurred is present, during generation of a temporary map, the changed portion is provided with a flag QA=0 that means that the portion is unverified. When the quality of the temporary map is evaluated to be acceptable in the determination of the quality of the temporary map described above, QA=0 for the changed portion is changed to QA=1 that means that the portion is verified.

Thus, a cycle of generation of a temporary map→verification of the temporary map→update and distribution of an official map→verification of the official map→generation of a temporary map is appropriately performed, thereby maintaining freshness of the official map.

When the quality determination result of the temporary map at S106 indicates that the quality of the temporary map is unacceptable, a determination result indicating that the quality determination result of the temporary map is unacceptable is transmitted to the server 10, and the quality check result reflection unit 11*b* of the server 10 that has received the determination result does not transmit a signal for causing the temporary map to be an official map to the in-vehicle device 20. In this case, the map generation unit 11*a* of the server 10 generates again a temporary map taking into consideration newly accumulated map coordinate data and feature change information, and through the processing flow shown in FIG. 2 or 3, the in-vehicle device 20 performs verification of the temporary map and determination of quality of the temporary map.

In verification of the official map by the road information providing vehicle 30, when a driver, i.e., an occupant in the driver's seat operates the steering wheel, that is, when the occupant in the driver's seat intervenes in operation while steering operation or the like is being automatically controlled according to the road condition acquired by the sensors such as a camera and the first route information estimated on the basis of the distributed official map, the road information providing vehicle 30 may provide to the server 10 a report on a gap between the actual road condition and the official map data, associated with position information. In this case, the server 10 generates and distributes a new temporary map on the basis of the report from the road information providing vehicle 30.

Even in the case where the first route information estimated from the official map data differs from the second route information estimated from the road condition acquired by the sensors such as a camera, when route information generated as a result of intervention by the occupant in the driver's seat in operation matches the first route information estimated on the basis of the distributed official map, it may be considered that the road condition acquired by the sensors such as a camera is erroneous and the official map is correct.

The process described above may be performed as follows.

When the verification vehicle that has received a temporary map verifies the temporary map and the verification result is good, the verification vehicle may use the temporary map for control of assisted driving, automatic driving, or the like without reporting the verification result to the server. The verification vehicle may report to the server only when the verification result of the temporary map is poor. Furthermore, the server may determine that the verification result of the temporary map is good on the basis of the fact that the server does not receive a poor verification result during a predetermined verification period.

A vehicle to which an official map is distributed specifies a detailed position of the own vehicle on the map on the basis of the verified official map and information acquired by the road information acquisition unit 23, and performs automatic driving. Such vehicles include the verification vehicle including the in-vehicle device 20, and the road information providing vehicle 30.

The map generation system 1 according to the embodiments achieves the following effects.

The configuration of the map generation system 1 according to the embodiments performs verification of the temporary map by the in-vehicle device 20 of the verification vehicle and verification of the official map by the road information providing vehicle 30; thus, it is possible to provide a map generation system capable of providing map data with high reliability and maintaining highly fresh map data.

When the quality of the temporary map is acceptable, to a vehicle to which the temporary map has already been distributed, instead of transmitting updated official map data from the server 10 to the in-vehicle device 20, the server 10 transmits a signal for updating the official data that has already been distributed to the in-vehicle device 20 to an official map. Thus, unnecessary data is not transmitted from the server 10 to the in-vehicle device 20, leading to a reduction in the amount of data to be transmitted. This makes it possible for the in-vehicle device 20 to promptly acquire an official map. Furthermore, the amount of data communicated in the radio communication network 40 can be reduced; thus, for example, delay in communication in the entire radio communication network 40 can be avoided.

In the map generation system 1 according to the embodiments, determination of the quality of the temporary map by the in-vehicle device 20 of the vehicle that verifies the temporary map is performed in a mode in which no assisted driving or the like of the vehicle using the route information generated from the temporary map is performed. That is, verification of the temporary map is performed in the shadow mode. Accordingly, no assisted driving or the like using an unverified temporary map is performed; thus, a problem such as erroneous guidance of the vehicle can be avoided.

In the embodiments described above, the map data that is generated by the server and distributed to the vehicle may be a travel trajectory model. The travel trajectory model is, in other words, data indicating a travel trajectory that serves as a reference during automatic driving. The travel trajectory model may be obtained, for example, by averaging travel loci for the respective lanes. Through verification by the method described above, the travel trajectory model may also be generated as a temporary map or employed as an official map. Furthermore, an object to be verified in the distributed map may not necessarily be a tangible object such as a division line or a feature, and may be a virtual feature. The virtual feature indicates a virtual (intangible) object for controlling the vehicle. Such virtual features include the travel trajectory model described above, a virtual lane boundary line in an intersection, and the like.

The present disclosure has been described in accordance with the embodiments, but it is understood that the present disclosure is not limited to the embodiments or structures. The present disclosure encompasses various modifications and variations in an equivalent range. In addition, the scope and spirit of the present disclosure encompass various combinations or forms and other combinations or forms including only one element, one or more elements, or one or less elements.

CONCLUSION

As described, the present disclosure provides a method and system for generating a map and an in-vehicle device that are capable of providing map data with high reliability and maintaining highly fresh map data.

A first aspect of the present disclosure is a method executed by at least one processor in accordance with assisted driving or automatic driving of a vehicle. The method includes: acquiring road information from one or more sensors of the vehicle; acquiring a temporary map; calculating a difference amount A between route information generated from the temporary map and route information generated from the road information; and outputting a determination result indicating that quality of the temporary map is acceptable when the difference amount A is a predetermined value or less.

As a second aspect of the present disclosure, a map generation system is provided including: a server including a map generation unit and a quality check result reflection unit; and an in-vehicle device including an assisted driving control unit, a difference calculation unit, a map quality determination unit, and a road information acquisition unit. The map generation unit generates a temporary map and transmits the temporary map to the in-vehicle device. From first route information generated from the temporary map and second route information generated from road information acquired from the road information acquisition unit, the difference calculation unit calculates a difference amount A between the first route information and the second route information, and when the difference amount A is a predetermined value or less, a determination result indicating that quality of the temporary map is acceptable is transmitted to the quality check result reflection unit, and the quality check result reflection unit that has received the determination result transmits a signal for updating an official map using the temporary map to the in-vehicle device.

This configuration can provide a map generation system capable of providing map data with high reliability and maintaining highly fresh map data.

What is claimed is:

1. A method for updating an official map using a temporary map, the method executed by at least three processors in accordance with assisted driving or automatic driving of a vehicle among a plurality of vehicles, each of the plurality of vehicles equipped with one or more sensors to acquire road information, the method comprising:

acquiring, from the vehicle, road information from one or more sensors of the vehicle while the vehicle is performing automatic driving at a first automatic driving level;

generating the temporary map using the road information acquired during automatic driving using the first automatic driving level;

verifying the temporary map by transmitting the temporary map to a verification vehicle among the plurality of vehicles, generating, using the verification vehicle, first route information for automatic driving at the first automatic driving level using the temporary map, generating, using the verification vehicle, second route information for automatic driving at the first automatic driving level using road information acquired from one or more sensors of the verification vehicle, and calculating, using the verification vehicle, a difference amount A between the first route information generated from the temporary map and the second route information generated from the road information;

receiving, from the verification vehicle, a determination result indicating that a quality of the temporary map is acceptable in response to the difference amount A being a first predetermined value or less;

updating the official map, for use at a second automatic driving level that is higher than the first automatic driving level, using the temporary map in response to the determination result indicating that the quality of the temporary map is acceptable being outputted;

distributing the updated official map to the vehicle; and performing, by the vehicle, automatic driving using the updated official map at the second automatic driving level and using an own vehicle position specified by the one or more sensors of the vehicle.

2. The method according to claim 1, further comprising:

outputting a determination result indicating that the quality of the temporary map is unacceptable when the difference amount A exceeds the first predetermined value.

3. The method according to claim 1, wherein outputting the determination result is performed in a vehicle operation mode in which no assisted driving of the vehicle using the first route information generated from the temporary map is performed.

4. The method according to claim 1, further comprising:

calculating, using the vehicle, a difference amount C and a difference amount D, the difference amount C being an amount of difference between route information generated from the updated official map and route information generated from newly acquired road information, the difference amount D being an amount of difference between the route information generated from the updated official map and route information on a route on which the vehicle actually travels; and outputting feature change information, which is information regarding a change in a feature, when the difference amount C and the difference amount D exceed a second predetermined value.

5. The method according to claim 1, wherein the one or more sensors include at least one of a steering angle sensor that detects a steering angle of a steering wheel or a steered wheel of the vehicle, a vehicle speed sensor that detects a vehicle speed, a satellite positioning sensor that indicates a position of the vehicle, and an inertial sensor that indicates inertia of the vehicle.

6. The method according to claim 1, further comprising:

transmitting a signal to the verification vehicle to update an official map of the verification vehicle using the temporary map.

7. A method for updating an official map using a temporary map, the method executed by at least three processors in accordance with assisted driving or automatic driving of a vehicle among a plurality of vehicles, each of the plurality of vehicles equipped with one or more sensors to acquire road information, the method comprising:

acquiring, from the vehicle, road information from one or more sensors of the vehicle while the vehicle is performing automatic driving at a first automatic driving level;

generating the temporary map using the road information acquired during automatic driving using the first automatic driving level;

verifying the temporary map by transmitting the temporary map to a verification vehicle among the plurality of vehicles, generating, using the verification vehicle, first route information for automatic driving at the first automatic driving level using the temporary map, generating, using the verification vehicle, second route information for automatic driving at the first automatic driving level using the road information acquired from one or more sensors of the verification vehicle, and calculating, using the verification vehicle, a difference amount B between the first route information generated from the temporary map and the second route information which is information on a route on which the vehicle actually travels; and receiving, from the verification vehicle, a determination result indicating that a quality of the temporary map is acceptable in response to the difference amount B being a predetermined value or less;

updating the official map, for use at a second automatic driving level that is higher than the first automatic driving level, using the temporary map in response to the determination result indicating that the quality of the temporary map is acceptable being outputted;

distributing the updated official map to the vehicle; and performing, by the vehicle, automatic driving using the updated official map at the second automatic driving level and using an own vehicle position specified by the one or more sensors of the vehicle.

8. The method according to claim 7, further comprising:

outputting a determination result indicating that the quality of the temporary map is unacceptable when the difference amount B exceeds the predetermined value.

9. A method for updating an official map using a temporary map, the method executed by at least three processors in accordance with assisted driving or automatic driving of a vehicle, the method comprising:

distributing the official map to the vehicle, wherein the official map is generated using the temporary map when the temporary map is verified at a first automatic driving level, and the official map is for use at a second automatic driving level that is higher than the first automatic driving level;

acquiring road information from one or more sensors of the vehicle;

calculating, by the vehicle, a difference amount C between route information generated from the official map and route information generated from the road information, and a difference amount D between route information generated from the official map and route information which is information on a route on which the vehicle actually travels;

outputting, by the vehicle, feature change information, which is information regarding a change in a feature, when the difference amount C and the difference amount D exceed a predetermined value;

generating a new temporary map using the feature change information;

updating the official map using the new temporary map; and performing, by a vehicle to which the updated official map is provided, automatic driving using the updated official map.

10. The method according to claim 9, wherein the new temporary map is generated by accumulating the feature change information.

* * * * *